US012304719B1

(12) United States Patent
Gonzalez

(10) Patent No.: US 12,304,719 B1
(45) Date of Patent: May 20, 2025

(54) PIVOTING CAP WITH LOCKING MECHANISM FOR MEDICATION DISPENSER

(71) Applicant: Jose Gonzalez, San Antonio, TX (US)

(72) Inventor: Jose Gonzalez, San Antonio, TX (US)

( * ) Notice: Subject to any disclaimer, the term of this patent is extended or adjusted under 35 U.S.C. 154(b) by 323 days.

(21) Appl. No.: 18/098,243

(22) Filed: Jan. 18, 2023

Related U.S. Application Data

(63) Continuation-in-part of application No. 17/870,094, filed on Jul. 21, 2022, now Pat. No. 11,873,146.

(51) Int. Cl.
*B65D 83/04* (2006.01)

(52) U.S. Cl.
CPC ..... *B65D 83/0409* (2013.01); *B65D 83/0481* (2013.01); *A61J 2205/50* (2013.01)

(58) Field of Classification Search
CPC .............. B65D 50/041; B65D 83/0409; B65D 83/0481; A61J 7/04; A61J 7/0481; A61J 2205/40; A61J 2205/50
See application file for complete search history.

(56) References Cited

U.S. PATENT DOCUMENTS

| | | | | |
|---|---|---|---|---|
| 11,873,146 B1 * | 1/2024 | Gonzalez | B65D 83/0409 |
| 2006/0191959 A1 * | 8/2006 | Davies | B05B 11/1056 222/402.15 |
| 2010/0307208 A1 | 12/2010 | Corbin et al. | |
| 2013/0043204 A1 | 2/2013 | Simpson | |
| 2022/0273931 A1 * | 9/2022 | Jiang | A61M 39/20 |

* cited by examiner

*Primary Examiner* — Michael Collins
(74) *Attorney, Agent, or Firm* — Sanchelima & Associates, P.A.; Jesus Sanchelima; Christian Sanchelima

(57) ABSTRACT

A pivoting cap with locking mechanism for medication dispenser including a male and a female cap assembly secured by a pivot assembly. The male cap assembly is secured on top of a medication dispenser such as prescription bottles. The male cap assembly includes a locking arm with a locking lever attached to a bottom portion thereof, and a top portion. The female cap assembly includes a rotating cap having channels internally disposed. When assembled, the locking arm is received by one of the channels, thereby impeding said rotating cap from turning either direction. To free the rotating cap, a user must apply a radial force upon the lock arm, consequently the locking lever will be displaced inwardly. The user would then twist to move the cap to its respective indicia for its desired scheduling or to their dispensing opening.

8 Claims, 5 Drawing Sheets

PIVOTING CAP WITH LOCKING MECHANISM FOR MEDICATION DISPENSER

OTHER RELATED APPLICATIONS

The present application is a continuation-in part of the pending U.S. patent application Ser. No. 17/870,094, filed on Jul. 21, 2022, which is hereby incorporated by reference.

BACKGROUND OF THE INVENTION

1. Field of the Invention

The present invention relates to a cap for medication dispenser and, more particularly, to a pivoting cap with locking mechanism for medication dispenser that can be rotated both clockwise and counterclockwise, which renders the present invention ideal for left-handed, right-handed or even ambidextrous users.

2. Description of the Related Art

Several designs for dosage caps have been designed in the past. None of them, however, include a top cap that rotates about a pivot. The top cap is fixed in predetermined positions by means of a locking lever which interacts with slots disposed on the inner surface of the top cap. The locking lever is manually depressed by means of a lever arm, thereby disengaging the lever from one of the slots to consequently permit the cap to rotate in either direction.

Applicant believes that a related reference corresponds to U.S. patent application No. 2010/0307208 for a locking pill bottle. Applicant believes that another related reference corresponds to U.S. patent application No. 2013/0043204 for a lockable cap for a bottle. However, none of the references teach a pivoting cap with locking mechanism for medication dispenser. The present invention also includes indicia that informs the time of day in which medication was last accessed.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a pivoting cap with locking mechanism for medication dispenser that includes indicia to call for a daily administration schedule.

It is another object of the present invention to provide a pivoting cap with locking mechanism for medication dispenser that reduces the number of capsules/tablets being dispensed at a single attempt in contrast with the current way of uncapping the lid to pour out tablets/capsules.

It is another object of the present invention to provide a pivoting cap with locking mechanism for medication dispenser that reduces cross contamination of capsules/tablets by reducing the amount of medication poured out at any one single attempt.

It is another object of this invention to provide a pivoting cap with locking mechanism for medication dispenser that is capable of rotating clockwise and counterclockwise, this functionality makes the herein claimed invention perfect for ambidextrous users.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
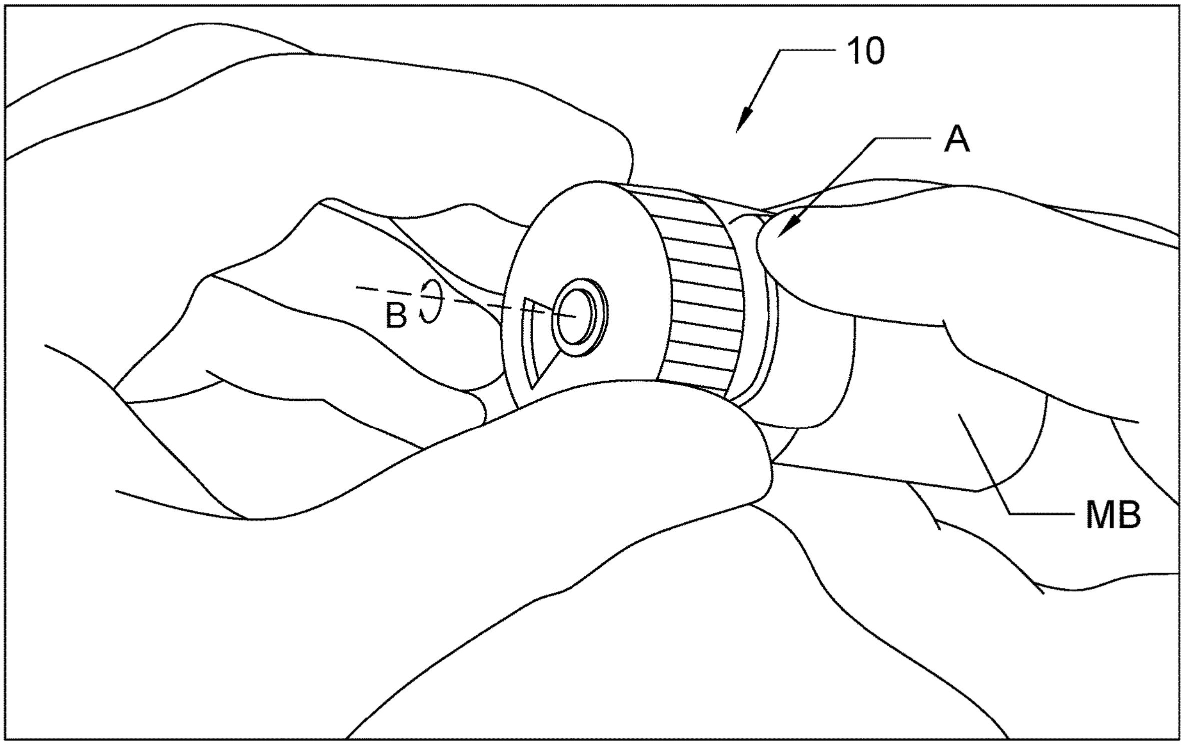
FIG. 1 represents an operational view according to an exemplary embodiment of the present invention 10. Line A represents the direction in which the tab has to be pressed in order to enable rotation of the cap. Line B depicts that the cap may rotate clockwise or counterclockwise if desired.

Referring now to the drawings, where the present invention is generally referred to with numeral 10, it can be observed that it basically includes a male cap assembly 20, a female cap assembly 40, and a pivot tip assembly 60. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

Figure 2:
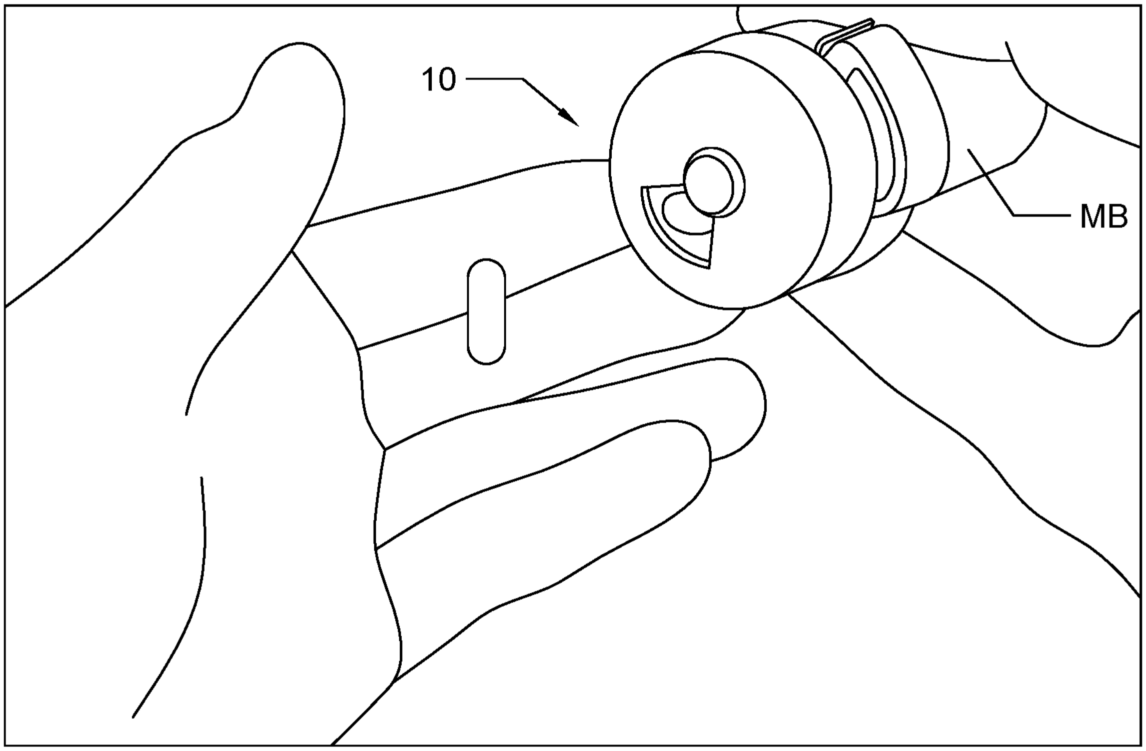
FIG. 2 represents an operational view according to an exemplary embodiment of the present invention 10 in which the cap is in open configuration, thereby permitting medication to be drawn out of the dispenser.
Figure 2A:
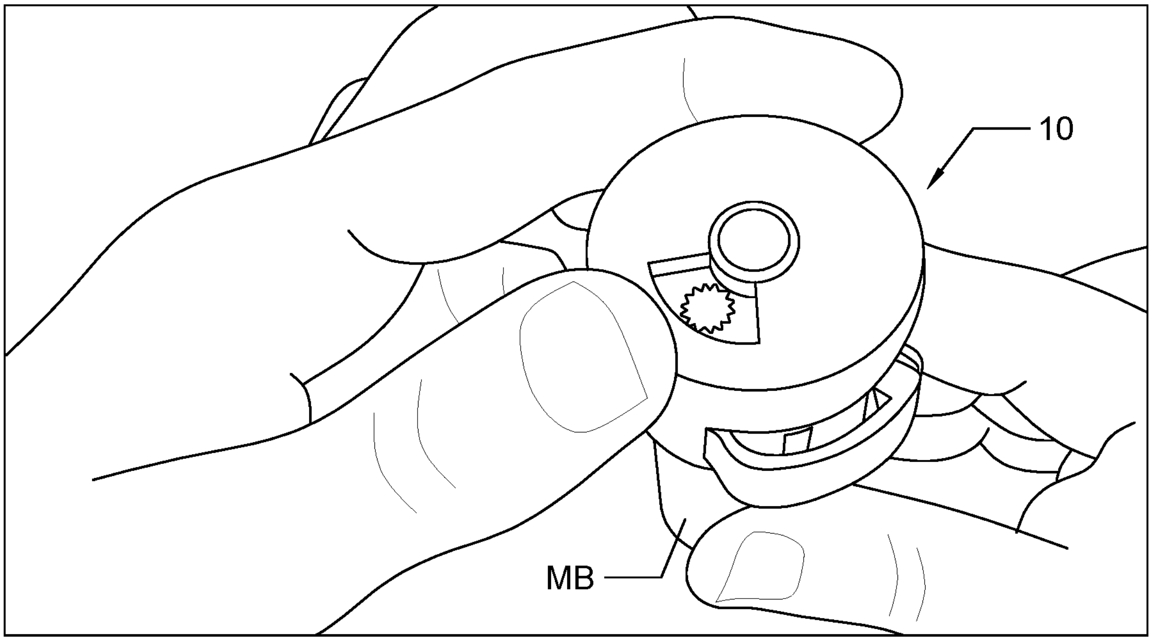
FIG. 2A represents an operational embodiment of the present invention 10 in which the cap is in closed configuration after having drawn medicine out of the medication dispenser MD.
Figure 3A:
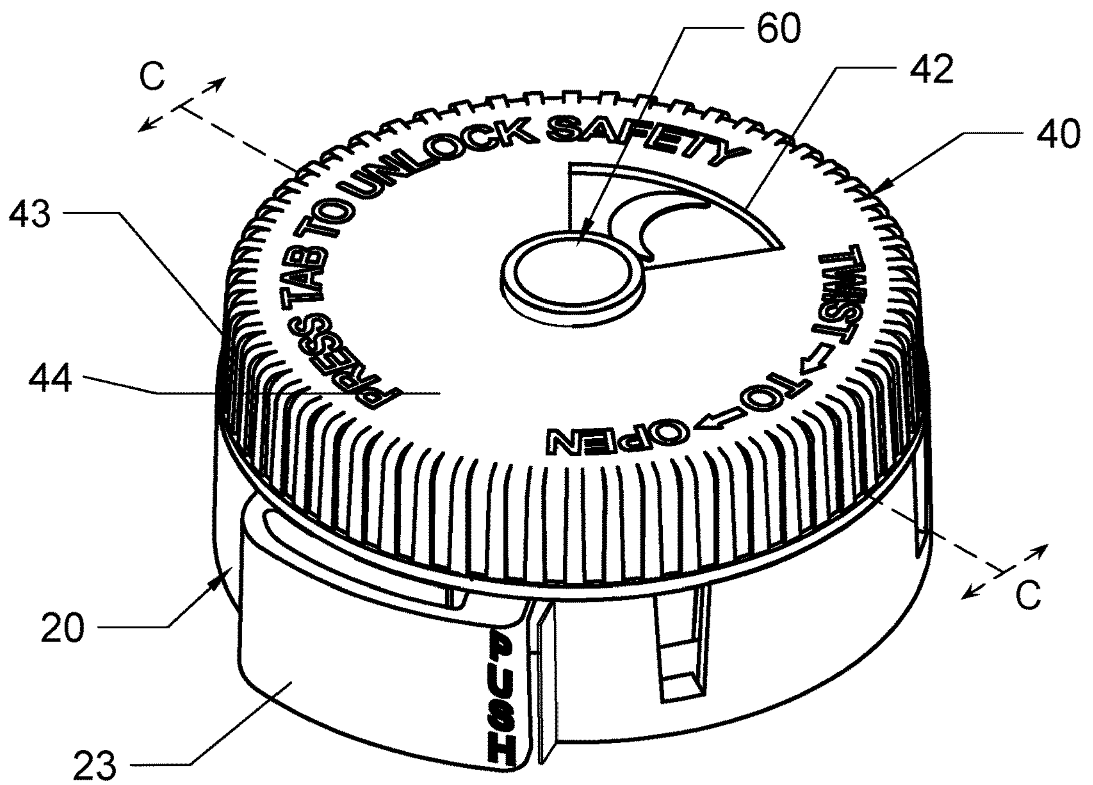
FIG. 3A illustrates a perspective view of one embodiment of the present invention in closed configuration.

Illustrated in FIGS. 1-1A and 3A in one embodiment of the present invention, the male cap assembly 20 is volumetrically suitable to be removably secured onto a medication dispenser MD such as a prescription bottle or any other variation known in the art. The present invention 10 is capable of presenting various sizes/geometries to be attached to existing retail pharmacy pill bottles/containers as known in the art. The male cap assembly 20 may be made of a lightweight, durable and resistant material. In a suitable embodiment, the male cap assembly 20 may be made of acrylic, polycarbonate, polyethylene, polypropylene, polyethylene terephthalate, polyvinyl chloride, acrylonitrile-butadiene-styrene, or any other suitable polymer as known in the art to manufacture bottle caps. However, in other embodiments, the male cap assembly 20 may be made of other suitable materials such as natural or synthetic fibers, metals, woods, ceramics, biodegradable materials, and/or any variation thereof. Line A in FIG. 1 shows where the force may be applied to make use of the present invention 10. Direction line B in same FIG. 1 is used to convey that the female cap 41 can be rotated in either direction, once the lever arm 23 may be pressed, to align the openings below described in order to access medication contained within the medication bottle MB as further shown in FIG. 2. The male cap assembly 20 may be secured onto the medication bottle MB using various attaching means, such as threaded portions, clips that may grasp the periphery of the medication bottle's top opening when pressed thereupon, and/or using any other suitable technology from the art to secure caps and bottles together.

Figure 3B:
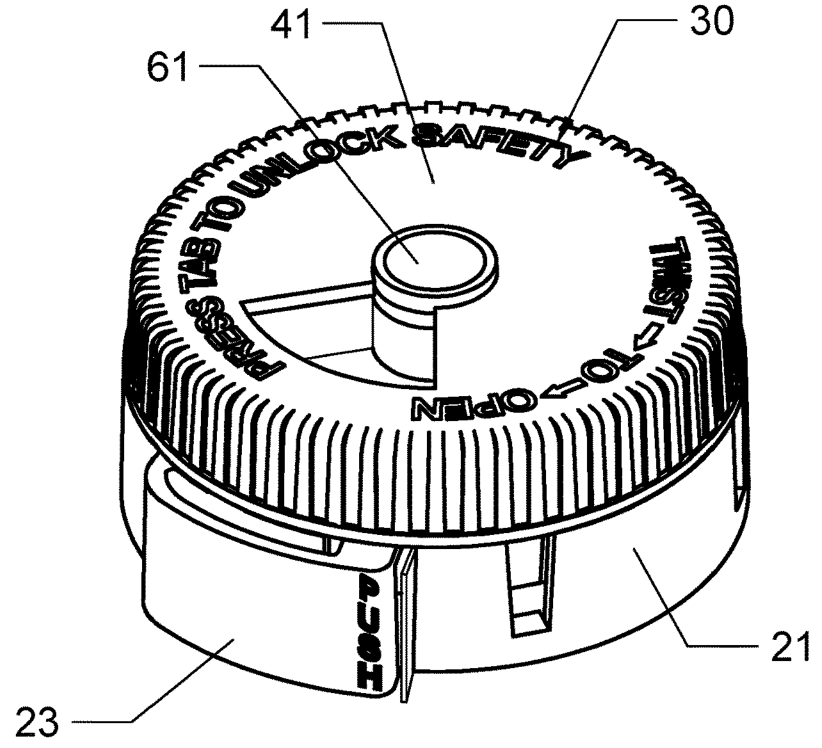
FIG. 3B illustrates a perspective view of one embodiment of the present invention in open configuration.
Figure 4:
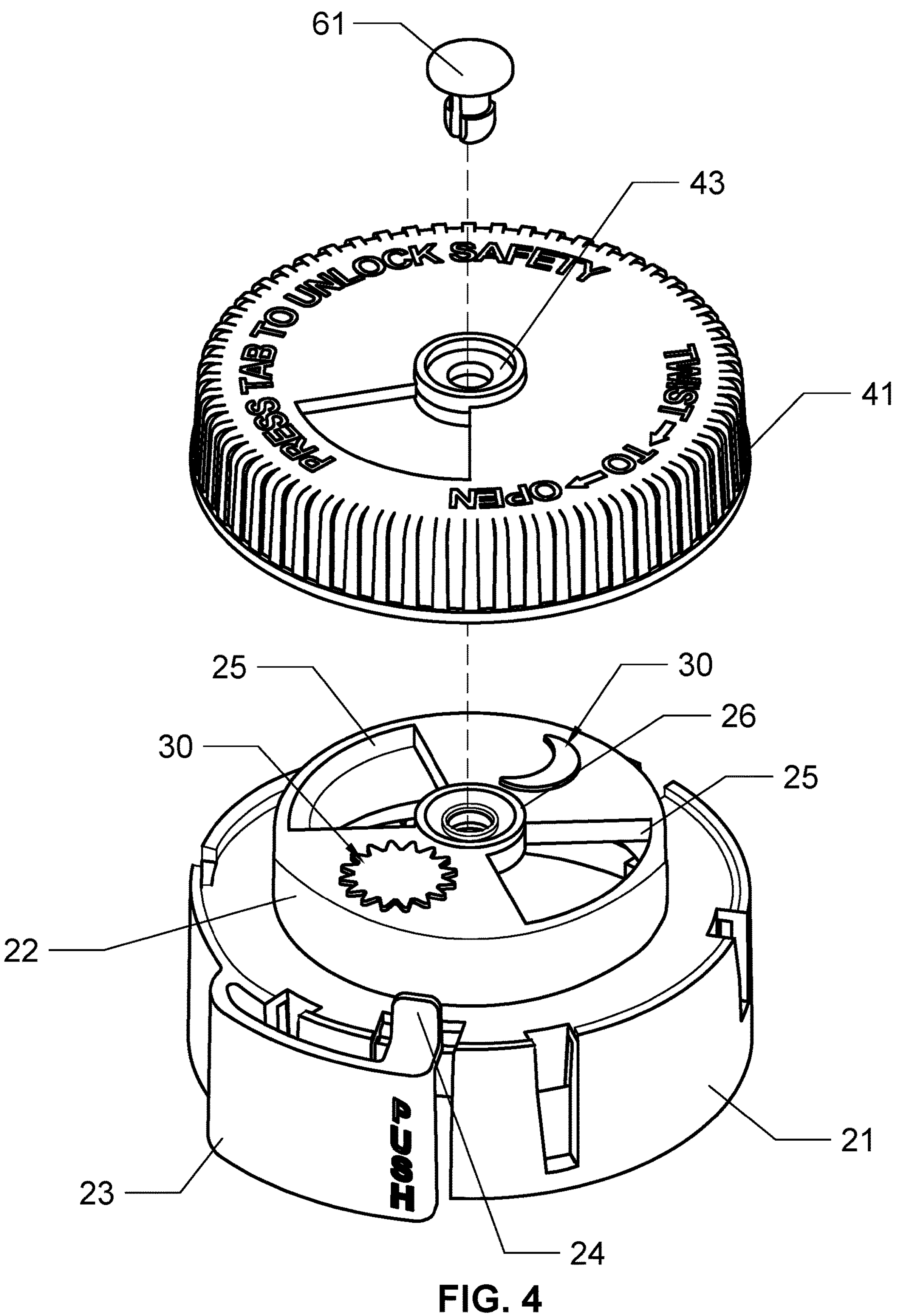
FIG. 4 illustrates an exploded view of one embodiment of the present invention.

FIGS. 3A, 3B and 4 show exemplary embodiments of the male cap assembly 20 which includes a bottom portion 21 and a top portion 22. In various exemplary embodiments, the bottom portion 21 may have a shape that conforms with the shape of the medication dispenser MD. In a suitable embodiment, the bottom portion 21 may have a cylindrical shape. In other embodiments, the bottom portion 21 may have any other suitable shape such as oval shape and/or the like. The bottom portion 22 being circular may have a predetermined diameter. The bottom portion 22 may have slots about an external surface, wherein each slot may have a rectangular shape and may be separated from one another by a predetermined distance. The base portion 22 may include a lever arm 23 that may have indicia on a front surface, wherein the indicia may convey different messages such as "PUSH", "PRESS", or any other suitable concatenation of characters that would indicate that a press force should be exerted thereon to actuate the present invention. The lever arm 23 may extrude outwardly from the base to then extend parallelly with respect to the external surface of the base portion 22 as best shown in FIG. 4. The lever arm 23 may include a base that connects it to the base portion 21, presenting a rounded transition thereat. In different exemplary embodiments, the lever arm 23 and the bottom portion 21 may be all or partially monolithic and may be manufactured using various methods such as additive manufacturing, or any other from the art. The lever arm 23 further includes an upward-facing locking lever 24 located on a distal end thereof opposite to the section that connects the lever arm 23 with the bottom portion 21. The locking lever 24 as shown in exemplary FIG. 4 may extend towards said bottom portion and may be received inside of the above mentioned slots to then extend upward a predetermined distance. The lever arm 23 may be flexible so that a user may be able to press it towards the base portion 22 and consequently move the locking lever 24. As depicted in FIG. 4 the locking lever 24 may have room to be displaced inside the slot, upon pressing of the lever arm 23.

As shown in exemplary FIG. 4, the top portion 22 may be located above of the bottom portion 21. In one embodiment, the top portion 22 may be cylindrical. However, in other embodiments, the top portion 22 may have different suitable shapes. In one embodiment, the bottom portion 21 and the top portion 22 may be concentrical. The top portion 22 being circular at its base, may have a predetermined diameter that may be smaller than the diameter exhibited by the bottom portion 21. On a topmust surface, the top portion 22 may include at least one dosing aperture 25 around a central opening 26. In an exemplary embodiment, as the one illustrated in FIG. 4, the present invention 10 may include two dosing apertures 25 which may be located 180 degrees across from one another. In other embodiments, the present invention 10 may include more dosing apertures 25 case dependent. The description of the number of possible dosing apertures is intended to be deemed for illustrative purposes and not in a limiting sense, reason why the apertures are defined as at least one dosing aperture 25. The central opening 26 may have a suitable shape to receive the pivot tip assembly 60. Upon said topmust surface, the top portion 22 displays a dosage regimen indicia 30. In an exemplary embodiment, the dosage regimen indicia 30 may be located 180 degrees across from one another and with a 90 degree offset with respect to the at least one dosing aperture 26. Nonetheless, the dosage regimen indicia 30 and the at least one dosing aperture 25 may be disposed in different arrangements case dependent. In one embodiment, the dosage regimen indicia 30 may be a pictorial representation of a moon and a sun, intended to inform the user a medication dose must be taken at day/night time as shown in FIG. 4. In other embodiments, the dosage regimen indicia 30 may be any other suitable pictorial representation that conveys different day times. In a suitable embodiment, the dosage regimen indicia 30 may be interleaved with the at least one dosing aperture 25 upon the topmost surface.

Better depicted in FIGS. 3A, 3B and 4 the female cap assembly 40 may be volumetrically suitable to be inserted onto the top portion 22 of the bottom cap assembly 20 as further shown in FIG. 3A wherein both assemblies (20 and 40) are assembled. In one embodiment, the female cap assembly 40 may be made of a lightweight, durable and resistant material. In a suitable embodiment, the female cap assembly 40 may be made of acrylic, polycarbonate, polyethylene, polypropylene, polyethylene terephthalate, polyvinyl chloride, acrylonitrile-butadiene-styrene, or any other suitable polymer as known in the art to manufacture bottle caps. However, in other embodiments, the female cap assembly 40 may be made of other suitable materials such as natural or synthetic fibers, metals, woods, ceramics, biodegradable materials and/or any variation thereof. in an exemplary embodiment, the female cap assembly 40 further includes a rotating cap 41 that has a lateral wall 41A that may exhibit a series of ridges disposed perpendicularly that follow a circular pattern. In other suitable embodiments, the lateral wall 41A may exhibit a plain surface. In yet another embodiment, the lateral wall 41A may present different patterns from the art that may help to enhance the gripping thereof. On an uppermost surface, the rotating cap 41 may include a dispensing opening 42 having a shape that conforms with the shape of the at least one dosing aperture 25. About a periphery of the uppermost surface, the rotating cap 41 may include indicia 32 that may inform a user of how to properly use the present invention 10, such as the text presented, for illustrative purposes, in FIGS. 3A, 3B and 4. In one embodiment, the indicia 32 indicates a message such as "PRESS TAB TO UNLOCK SAFETY", "TWIST TO OPEN". However, in different embodiments, the indicia may display different messages and/or in different languages as known in the art and that are related to the invention disclosed herein. The rotating cap 41 further includes a top opening 43 having a circular shape that is disposed on a center position thereof. When assembled, the top opening 45 may be flush with the central opening 26. The rotating cap 41 further includes a circular wall 43*a* that surrounds the top opening 43 and that protrudes outwardly with respect to the uppermost surface thereof. A distal end of the dispensing opening 42 may be in abutting contact with the circular wall 43*a* as illustrated in FIG. 4.

As illustrated in FIG. 4, the pivot assembly 60 includes a pivot tip 61 which is an element used to movably secure the female cap assembly 40 to the male cap assembly 20 while acting as an axle about which the female assembly 40 may rotate as conveyed by line B in FIG. 1. In an exemplary embodiment, the pivot tip 60 may consist of a shaft of varying diameter and length with a head attached to a distal end thereof. In one embodiment, the shaft may be volumetrically suitable to be inserted through both the top opening 43 and the central opening 26. Once inserted, the head of the pivot tip 62 may be volumetrically suitable to be enclosed by the circular wall 43*a*. In one exemplary embodiment, the shaft of the pivot tip 61 may have a slot that longitudinally travers it, thereby permitting the shaft to be compressed when inserted through the openings (26, 43). In another exemplary embodiment, the pivot tip 61 may have a disc or flanges from thereupon to form a stop, that may prevent the pivot tip to freely displace along its vertical axis.

Figure 5:
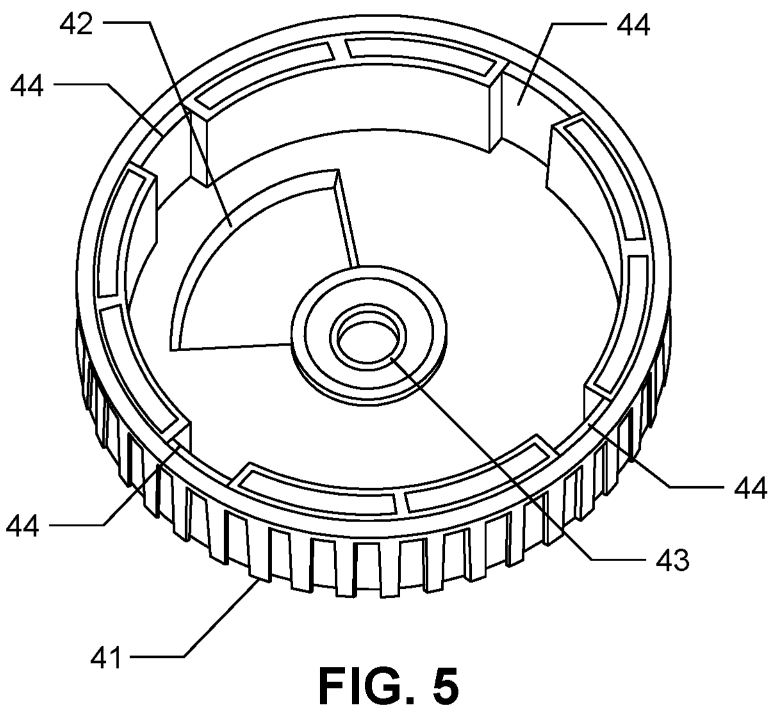
FIG. 5 shows a rear perspective view of the present invention.

Referring now to FIG. 5 which is a bottom isometric view of an exemplary embodiment of the female cap assembly 40, it can be seen that the rotating cap 41 may be hollow. About an interior surface of the circular wall 43*a*, the rotating cap 41 may present channels 44 disposed on predetermined arrangements about the internal periphery thereof, wherein each channel is separated to each other by a predetermined distance. In a suitable embodiment, each channel may be related to the at least one dosing aperture 25 and the dosage regimen indicia 30. In one embodiment, and for illustrative purposes, the dosage regimen indicia 30 may be comprised of two pictorial representations (a sun and a moon), and the at least one dosing aperture 25 may include two dosing apertures, thus there may be four channels associated with each of the aforementioned elements. In other embodiments, the number of channels 44 may be directly related to the number of at least one dosing aperture 25 and dosage regimen indicia 30. The channels 44 may be internal cuts having any suitable shape that may conform with the geometry of the locking lever 24, thereby providing a void where the locking lever 24 may recess when in resting configuration, said resting configuration is defined as the placement of the locking lever 24 when no force is applied upon the lever arm 23.

When the female cap assembly 40 is secured onto the male cap assembly 20 by means of the pivot assembly 60 there may be an internal interaction of elements that permit the present invention 10 to be locked at predetermined positions and unlocked when a user disengages the internal mechanisms by means of the lever arm 24. Additionally, as the rotating cap 41 may enclose the top portion 22, the elements present in the top portion 22, such as the at least one dosing aperture 26 and the dosage regimen indicia 30, may align with the dispensing opening 42 at predetermined positions thereof when rotating. In one exemplary embodiment, where one of the at least one dosing aperture 25 aligns with the dispensing opening 42, an opened configuration is defined/best shown in FIG. 3A). When one of the dosage regimen indicia 30 aligns with the dispensing opening 42 a closed configuration is defined (best shown in FIG. 3B). When the female cap assembly 40 is secured onto the male cap assembly 20 by means of the pivot assembly 60, the locking lever 24 may be enclosed by the rotating cap 41. The lever arm 24 is configured to interact with the channels 44. The rotating cap is configured to be turned in either direction (clockwise or counterclockwise) until the locking lever 24 is entered into one of said channels 44 to have the present invention 10 in one of said open configuration or closed configuration.

Figure 6:
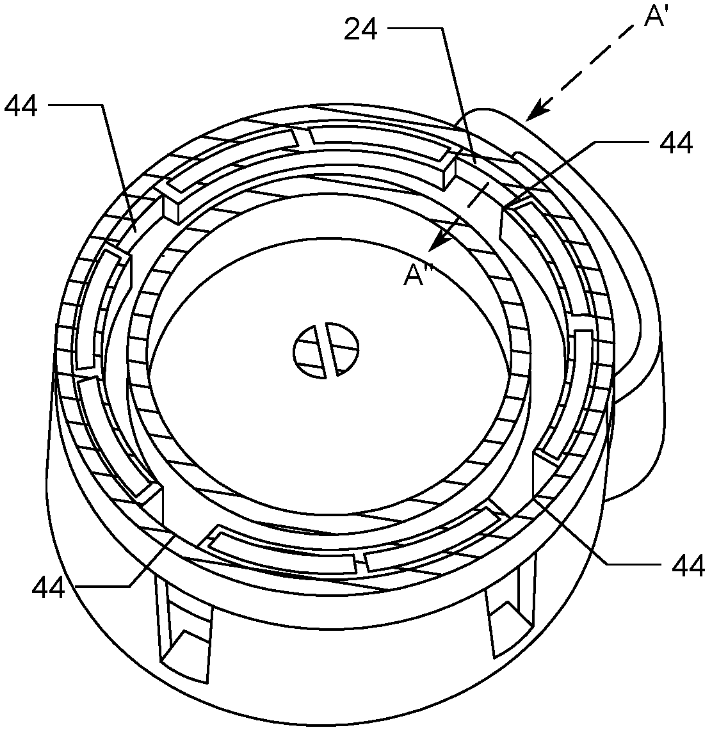
FIG. 6 shows a cross section view from lines C-C as shown in FIG. 3A of the present invention.

Exemplary FIG. 6 shows a cross section view of embodiment illustrated in FIG. 3A from lines C-C. FIG. 6 is a suitable view that depicts the interaction between the locking lever 24 with one of the channels 44. In an exemplary embodiment, in which the locking lever may be engaged to one of the channels 44 to define either of said open configuration or said closed configuration, the channel locking lever 24 may collide with the inner walls of the channel when the rotating cap 41 may be tried to be turned. In order to release the rotating cap 41, a force (conveyed using line A') may be exerted on the lever arm 23, consequently the locking lever 24 may be displaced radially towards the center of the present invention 10 as conveyed by line A". Thereby, the locking lever 24 may disengage from one of the channels and the rotating cap 41 is capable of being manipulated. Locking lever 24 may naturally present a deformation resistance by exerting an opposite force from the one applied onto the lever arm 23. The deformation resistance is a widely known feature of various materials from the art. As the rotating cap 41 is turned, the locking lever 24 in abutting contact with the interior surface of the cap 41 until a channel from the channels 44 may be reached. The hereby presented configuration in its various embodiments is suitable because it permits a right-handed user, a left-handed user or an ambidextrous user to use the present invention 10 without the inconvenience that a cap that rotates in a single direction may present. In one embodiment, when the dispensing opening 42 may be aligned with one of the at least one dosing aperture 25, medication can be dispensed by inverting the prescription bottle. The dispensing opening 42 may also permit the dosage regimen indicia 30 (be it a sun and a moon for explanatory purposes) to be visible when the present invention is in closed configuration, thereby can be used to record the time of day the medication was last accessed. While preferred embodiments of the preferred, dosage regimen indicia 30, indicia 32, number of openings (25, 42), number of channels 44, of the present invention 10 have been described, numerous changes in the construction and design of the dispensers described above may be made without departing from the scope of the present invention as defined by the appended claims.

The present invention in its various embodiments previously described may be manufactured in glow-in-the-dark material, as known in the art, if required since the use of various materials does not change the structural features of the invention but provides additional benefits thereto. The present invention in its various embodiments may also exhibit cancer color coding if required. The indicia described in the various embodiments of the present invention may be included using various methods as known in the art such as, but not limited to, heat-stamped method on its respective symbol with luminescence/phosphorescence and fluorescence material mixtures such as, but not limited to, zinc sulfide, sodium, strontium aluminate, and/or any variation thereof as known in the art.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A pivoting cap with locking mechanism for a medication dispenser, comprising:

a male cap assembly including a bottom portion and a top portion, the bottom portion includes a lever arm, wherein said lever arm has a distal end connected to the bottom portion, at an opposite end the lever arm includes a locking lever, said lever arm is configured to be pressed inward, the top portion has a topmost surface where at least one dosing aperture, dosage regimen indicia, and a central opening are disposed;

a female cap assembly including a rotating cap that is received by the top portion, an uppermost surface includes a dispensing opening and a top opening which is centered thereon, the top cap includes a lateral wall, about an interior surface of the lateral wall the top cap includes channels, wherein each of the channels is aligned with a position of the at least one dosing aperture and the dosage regimen indicia, the channels are volumetrically suitable to receive the locking lever therein;

a pivot assembly including a pivot tip configured to movably secure the rotating cap onto the male cap assembly while acting as an axis about which the rotating cap turns, said pivot tip is to be inserted through the top opening and the central opening; and said locking lever is to be received by one of the channels when said rotating cap is turned, thereby locking said rotating cap from tuning, said locking lever is configured to be pressed to disengage said locking lever from one of said channels.

2. The pivoting cap with locking mechanism for the medication dispenser of claim 1, wherein said top portion has a smaller diameter than a diameter of the base portion.

3. The pivoting cap with locking mechanism for the medication dispenser of claim 1, wherein an opened configuration is defined when the dispensing opening aligns with one of the at least one dosing aperture.

4. The pivoting cap with locking mechanism for the medication dispenser of claim 1, wherein a closed configuration is defined when the dispensing opening aligns with one of the dosage regimen indicia.

5. The pivoting cap with locking mechanism for the medication dispenser of claim 1, wherein the number of channels is directly related to the number of said at least one dosing aperture and said dosage regimen indicia.

6. The pivoting cap with locking mechanism for the medication dispenser of claim 5, wherein each channel is disposed to permit an alignment of the dispensing opening with one of the at least one dosing aperture or one of the dosage regimen indicia, the alignment is achieved when the lever arm sits in one of said channels.

7. The pivoting cap with locking mechanism for the medication dispenser of claim 1, wherein said dosage regimen indicia is a pictorial representation that conveys different day times be it a sun, a moon, and/or abbreviations such as AM/PM/X.

8. A pivoting cap with locking mechanism for a medication dispenser, consisting of:

a male cap assembly including a bottom portion and a top portion, the bottom portion includes a lever arm, wherein said lever arm has a distal end connected to the bottom portion, at an opposite end the lever arm includes a locking lever, said lever arm is configured to be pressed inward, the top portion has a topmost surface where at least one dosing aperture, dosage regimen indicia, and a central opening are disposed;

a female cap assembly including a rotating cap that is received by the top portion, an uppermost surface includes a dispensing opening and a top opening which is centered thereon, the top cap includes a lateral wall, about an interior surface of the lateral wall the top cap includes channels, wherein each of the channels is aligned with a position of the at least one dosing aperture and the dosage regimen indicia, the channels are volumetrically suitable to receive the locking lever therein;

a pivot assembly including a pivot tip configured to movably secure the rotating cap onto the male cap assembly while acting as an axis about which the rotating cap turns, said pivot tip is to be inserted through the top opening and the central opening; and said locking lever is to be received by one of the channels when said rotating cap is turned, thereby locking said rotating cap from turning, said locking lever is configured to be pressed to disengage said locking lever from one of said channels.

* * * * *